Oct. 14, 1952 J. R. SHIELDS 2,613,513
VAPOR CONDENSING APPARATUS AND METHOD
Filed April 6, 1946
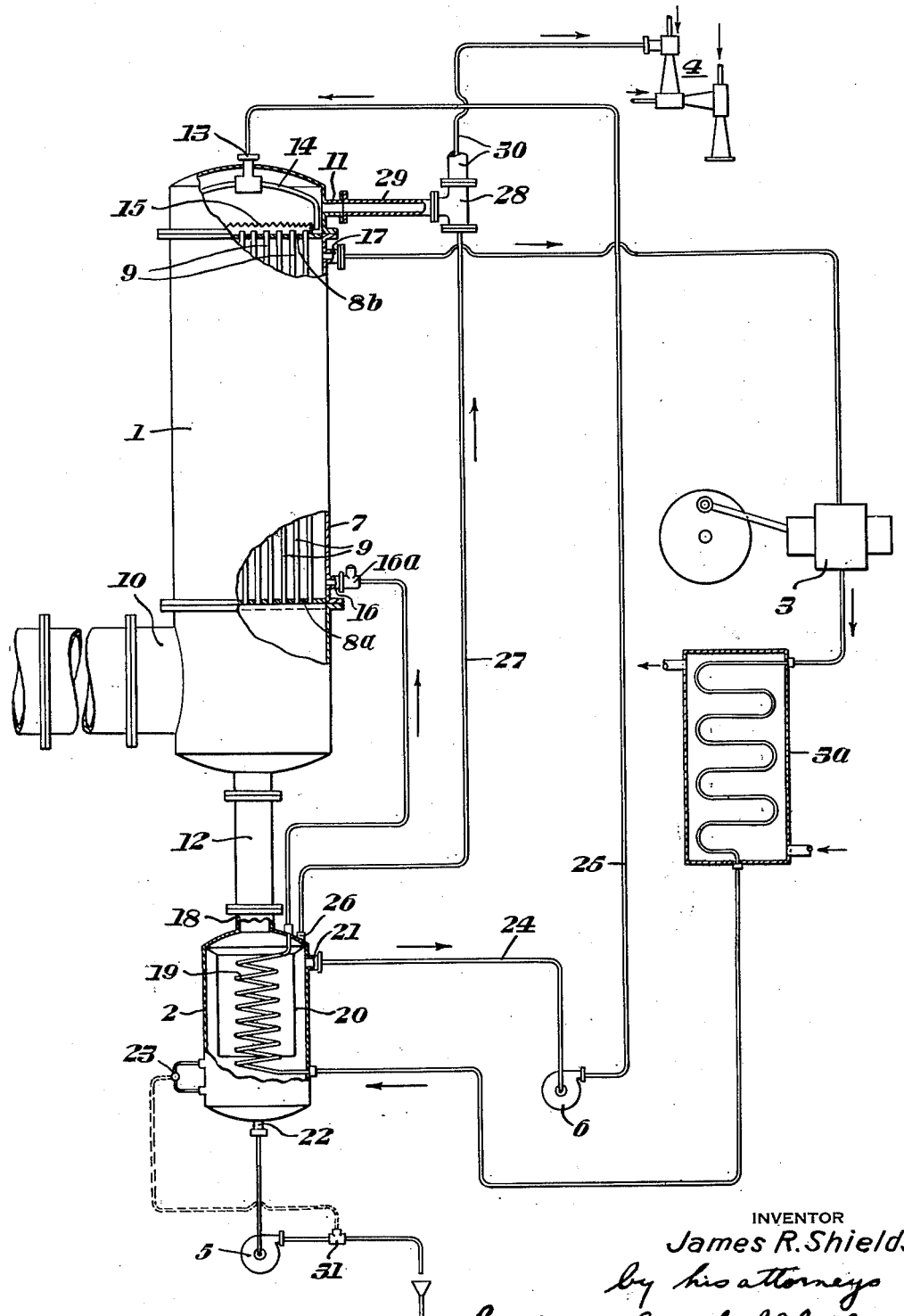
INVENTOR
James R. Shields
by his attorneys
Stebbins, Blenko & Webb Patented Oct. 14, 1952

2,613,513

UNITED STATES PATENT OFFICE 2,613,513

VAPOR CONDENSING APPARATUS AND METHOD

James R. Shields, Pittsburgh, Pa., assignor to Blaw-Knox Company, Pittsburgh, Pa., a corporation of New Jersey Application April 6, 1946, Serial No. 660,133

8 Claims. (Cl. 62—124)

My invention relates to the continuous separation of a fluid mixture into its constituent materials generally under conditions of vacuum. The mixture may be any solution, suspension, slurry, emulsion, or other essentially fluid matter composed of different constituent materials, all of which may be normally fluids, or some may normally be solids and some fluids, and the invention is generally applicable to separating such mixtures where a desired constituent or group of constituents together may be deposited in solid form on a heat exchange surface in vacuum.

An object of my invention is to improve apparatus in which such separations may be effected, particularly so as to provide continuous discharge of the solid deposit. Another object is to provide a novel method for continuously separating such mixtures into solid and fluid materials under vacuum and continuously progressing the separated materials to different points at higher pressure such as that of the atmosphere. Other objects will be apparent from the following description of the invention and various embodiments thereof.

In the practice of my process, the fluid mixture is caused to flow into a vacuum treating chamber having certain interior surfaces maintained at conditions to effect a heat transfer with the mixture such that one or more constituents separate out in solid form at the surface. Such separation may obviously be effected in some cases by evaporating away liquid constituents of the mixture leaving a solid residue or in other cases by freezing out a fluid constituent in solid form. The interior space of the chamber is continuously evacuated by means of suitable ejectors or pumps to maintain the desired low pressure and to remove any remaining fluid constituent from the chamber to atmospheric pressure. The surface at which the solidification is effected may be a solid wall from which the deposit is cleaned by mechanical means, or it may be a liquid surface preferred in one form of my invention.

I employ an improved continuously discharging liquid sealed trap for removing the solids from vacuum to higher pressures. The solids may if desired be dissolved in the sealing liquid, and continuously removed in solution, or, perhaps more generally, the solids may be caused to settle through the sealing liquid and separated therefrom below the liquid surface. In one form of my apparatus, surface of a portion of the sealing liquid may be employed as the heat exchange surface at which separation of the solid material is effectuated.

The invention will be more perfectly understood by the following description of examples of certain embodiments shown in the accompanying figure, in which the figure shows a continuous freeze-out condensing system utilizing my invention as it might be applied, for example, to high-vacuum continuous steam distillation.

Referring now to the drawings, the figure shows a vacuum freeze-out condenser having an extensive heat exchange surface adaptable to dispose of large quantities of steam at very low pressures as may be desired, for example, in connection with vacuum steam distillation. The apparatus is comprised of a freezing chamber 1, a melter 2, a refrigerating compressor 3 with its auxiliary cooler 3a, a vacuum ejector 4, a water disposal pump 5, an oil circulating pump 6 and the piping and auxiliary controls for connecting these various units in operative relation. The freezing chamber 1 is comprised of a shell 7 which ordinarily would be protected by insulation, not shown on the drawings. The shell 7 is a generally vertically disposed closed cylinder and is divided into three zones by substantially horizontal tube sheets 8a and 8b. Between the tube sheets extends a plurality of substantially vertical pipes 9 the upper ends of which project slightly above the upper surface of tube sheet 8b. A vapor inlet 10 into the shell is provided below tube sheet 8a and a vapor outlet 11 is provided above the upper tube sheet 8b so that gases and vapors passing through the apparatus flow upwardly through the tubes 9. In the bottom of the chamber 1 a drain 12 is provided leading to the melter subsequently to be described. A continuous flowing film of oil passes downwardly over the inside surfaces of the tubes 9. This oil is introduced through a manifold 13 at the top of the condenser 1 and is directed by pipes 14 to a plurality of points in a circumferential channel defined between the outside shell 7 and a circumferential notched weir 15. The oil flows radially over the weir 15 and the upper tube sheet 8b overflowing into the tubes 9. The weir and manifold are provided to properly distribute the oil to all of the tubes. A suitable refrigerant is circulated about the outsides of the tubes 9, being introduced at inlet 16 through expansion valve 16a and withdrawn at outlet 17, both of which connect through the shell between the tube sheets 8a and 8b. This refrigerant is maintained at a temperature sufficiently low to cause water vapor to freeze upon contact with the oil surface flowing through the tubes. The ice is thus formed in a flowing liquid surface and does not adhere to the tubes 9, the ice and oil flowing out together through the drain 12 into the melter 2 by gravity.

The ice and oil enter the melter together through the inlet 18, the ice settling downward towards the bottom of the melter and being warmed by the melting coil 19 which is immersed in the oil. The coil 19 provides sufficient heat to melt the ice, and the water separates out below the oil in the lower part of the melter 2. A cylindrical baffle 20 extends downwardly from the upper part of the melter confining the settling ice and water particles to the interior regions above the water level and providing a zone for the separation of the oil, which flows out through outlet 21 and pipe 24 to pump 6. This pump delivers the oil through pipe 25 back to the inlet manifold 13 in the condenser and causes a continuous circulation of oil through the condenser and melter. A water outlet 22 is provided in the bottom of the melter, and the separated water flows therefrom to the pump 5 whereby the water is transferred to atmospheric pressure and removed from the condenser system. An interface level controller 23 is provided which is sensitive to the water level in the melter 2 and controls a discharge valve 31 to maintain the water level substantially constant. This provides that the water will be continuously discharged in liquid form at the same rate as it is condensed in the freezer 1.

A vent 26 in the melter connects through pipe 27 and T 28 and pipe 29 to the freeze-out condenser. The T 28 also connects these points through pipe 30 to the multiple stage ejector 4 thereby maintaining the desired low pressure in the apparatus.

From the foregoing it will be seen that the present invention provides a means whereby a single freeze-out condenser may be operated continuously and the condensate removed continuously in the liquid state in which form it is most conveniently disposed of. The invention is applicable to thus remove various kinds of vapors which may be frozen to a solid state, but its greatest utility is probably for the removal of water vapor or steam. In any case, the auxiliary liquid used would be a liquid of lower vapor pressure than the absolute pressure within the condenser and of lower specific gravity than the solid and liquid form of the vapor to be disposed of in the condenser. In the previously described example in which the removal of water was being discussed the liquid was designated by the word "oil," which was used in its popular sense connoting generally a liquid lighter and immiscible with water. Of course, liquids having the above mentioned properties, although they may not be technically known as oils, are intended to be included as being of complete equivalents of the purposes of this invention. Examples of suitable liquids are certain paraffinic hydrocarbons and dibutyl phthalate. The properties desired of a preferred fluid for this particular purpose are that it shall have a specific gravity less than .87, that it shall have a boiling point at 2 mm. to 10 mm. absolute pressure above 35° F. and that it be immiscible with ice and water.

In the operation of the above described condenser the ice freezes at the surface of the oil film in relatively small particles without direct contact with any solid and is carried away in the flowing oil as the ice is formed. This provides an automatic means of cleaning the condensing apparatus and of disposing of the ice as it is formed, and permits the maintenance of a large freezing surface in a small space under continuous operation.

In the freeze-out condenser shown in the figure it will be noted that a column or layer of substantial depth of oil floats between the surface of the water being removed from the apparatus, and the space at which high vacuum is maintained. By this means flashing of the water into vapor within the apparatus is prevented, the head of oil floating upon the water surface being sufficient to establish a pressure at the water surface greater than the vapor pressure of the melted ice. Ordinarily, the depth of oil above the water level would be such as to produce a head exceeding 5 or 6 millimeters of mercury. In practice considerably greater depths would preferably be used, and shallow depths approaching the critical head which would permit the water to boil, should, of course, be avoided.

It is also apparent that a barometric leg may be substituted for the pump and level control shown in the figure. It is also obvious that many of the advantages of my invention applicable to a freeze-out condenser may be obtained without melting the ice prior to its removal to atmospheric pressure from the vacuum apparatus. The ice may for example be permitted to settle out into the bottom of a well through a barometric leg and removed therefrom in either the solid or liquid form; or a means for replenishing the sealing liquid may also be provided with the vacuum condenser and the ice may be continuously removed in suspension in the sealing liquid and separated therefrom subsequently by filtering or centrifuging as desired. Furthermore, my novel apparatus and method are not limited to the condensing of water vapor and drying of liquids but the apparatus and the principles involved may be provided to the removal of any substances which form a solid deposit upon a hot or cold surface under vacuum with or without chemical change.

While I have described and disclosed certain embodiments and examples of my invention, it is to be understood that the invention is not so limited but may be otherwise embodied and practiced within the scope of the following claims.

I claim:

1. In a method of condensing and removing condensable vapor, the steps comprising, continuously passing said condensable vapor over a solid condensing surface adjacent thereto, refrigerating the condensable vapor by removal of heat through said condensing surface to a temperature sufficient to condense said condensable vapor to at least a partially solid state, and continuously passing a film of liquid over said condensing surface in contact therewith, whereby as said condensed vapor is condensed it is continuously prevented by said liquid from adhering to said condensing surface.

2. In a method of condensing and removing condensable vapor, the steps comprising, continuously passing said condensable vapor over a solid condensing surface adjacent thereto, refrigerating the condensable vapor by removal of heat through said condensing surface to a temperature sufficient to condense said condensable vapor substantially to its frozen state, and continuously passing a film of a liquid such as oil over said condensing surface in contact therewith, said liquid being immiscible with said condensable vapor in any state and having a negligible vapor pressure relative to the pressure existing over said condensing surface, whereby as said condensable vapor is condensed into its frozen state it forms particles in said film of liquid which are continuously removed from said condensing surface.

3. In a method of substantially entirely condensing and removing condensable vapor such as water vapor, the steps comprising, continuously passing said condensable vapor under a vacuum condition over a solid condensing surface adjacent thereto, refrigerating the condensable vapor by removal of heat through said condensing surface to a temperature sufficient to condense said condensable vapor to its frozen state, continuously passing a film of a liquid such as oil over said condensing surface in contact therewith, said liquid being immiscible with said condensable vapor in any state and having a negligible vapor pressure relative to the pressure existing over said condensing surface, said liquid further having a lower specific gravity than said condensed vapor, and separating said liquid from said condensed vapor by gravity, whereby said condensable vapor is condensed, continuously removed from said condensing surface and separated from said liquid.

4. In an apparatus for condensing and removing condensable vapor in its condensed state, in combination, a condensing vessel assembly, at least one solid condensing wall positioned at an angle to the horizontal in said assembly, means for causing a substantially non-vaporizing liquid to flow over the condensing side of said wall, means for passing a condensable vapor over said wall on said condensing side in proximity thereto, and means for circulating a refrigerant against the other side of said wall to abstract heat through said wall and condense said condensable vapor, whereby said condensable vapors are condensed and continuously removed from the vicinity of said wall.

5. In an apparatus for condensing and removing condensable vapor in its condensed state, in combination, a condensing vessel assembly, at least one solid condensing wall positioned at an angle to the horizontal in said assembly, means for maintaining the pressure on the condensing side of said wall at less than atmospheric pressure, means for causing a liquid substantially non-vaporizing at that ambient pressure to flow in a film over said condensing side of said wall, means for passing a condensable vapor over said wall on said condensing side in proximity thereto, means for circulating a refrigerant against the other side of said wall to abstract heat through said wall and condense said condensable vapors into their frozen state as loose and separated particles in said liquid, said liquid further having a specific gravity less than said condensed vapor, and a separator for separating said liquid and condensed vapors by gravity.

6. In an apparatus for condensing and removing condensable vapor in its condensed state, in combination, a condensing vessel assembly, a solid condensing surface positioned at an angle to the horizontal in said assembly, weir members for distributing a substantially even film of liquid over said condensing surface, said liquid having a substantially negligible vapor pressure at the pressure in said assembly, means for passing a condensable vapor over said condensing surface in proximity thereto, and a circuit connected to said assembly for circulating a refrigerant against the back of said condensing surface to condense said condensable vapor into its frozen state where it may be removed by said liquid.

7. In a freeze-out condenser for water vapor or the like, in combination, a freezing chamber, generally vertical hollow tubes in said chamber, an oil circuit connected to said chamber to provide a flowing film of oil downwardly through said tubes, an independent refrigerating circuit to provide a flow of refrigerant around the exterior of said tubes within said chamber to freeze water vapor passing through the interior of said tubes, said water vapor being supplied under and the interior of said tubes being at subatmospheric pressure, whereby as said water vapor is frozen it becomes relatively loose particles readily removed from the interior of said tubes by said film of oil.

8. In a freeze-out condenser for water vapor or the like, in combination, a freezing chamber, generally vertical hollow tubes in said chamber, an oil circuit connected to said chamber to provide a flowing film of oil downwardly through said tubes, an independent refrigerating circuit to provide a flow of refrigerant around the exterior of said tubes within said chamber to freeze water vapor passing through the interior of said tubes, said water vapor being supplied under and the interior of said tubes being at subatmospheric pressure, said liquid being immiscible with and having a lower vapor pressure and specific gravity than said water vapor in its condensed states, a melting and separation vessel connected to the lower part of said freezing chamber to receive said liquid and condensed water vapor and to separate the same by gravity, said refrigerating circuit having a heat liberating portion in said vessel, whereby as said water vapor is frozen it becomes relatively loose particles readily removed from the interior of said tubes by said film of oil.

JAMES R. SHIELDS.

REFERENCES CITED

The following references are of record in the file of this patent:

UNITED STATES PATENTS

| Number | Name | Date |
|---|---|---|
| 1,289,613 | Bell | Dec. 31, 1918 |
| 1,735,869 | Knight | Nov. 19, 1929 |
| 1,755,810 | Carney | Apr. 22, 1930 |
| 1,974,145 | Atwell | Sept. 18, 1934 |
| 2,009,283 | Warner | July 23, 1935 |
| 2,067,043 | Caldwell | Jan. 5, 1937 |
| 2,100,151 | Tietz | Nov. 23, 1937 |
| 2,312,811 | Gentil | Mar. 2, 1943 |
| 2,436,693 | Hickman | Feb. 24, 1948 |
| 2,507,632 | Hickman | May 16, 1950 |